J. A. OLBON.
STEERING POST LOCK.
APPLICATION FILED OCT. 14, 1919. RENEWED SEPT. 30, 1920.
1,360,675.
Patented Nov. 30, 1920.
3 SHEETS—SHEET 1.
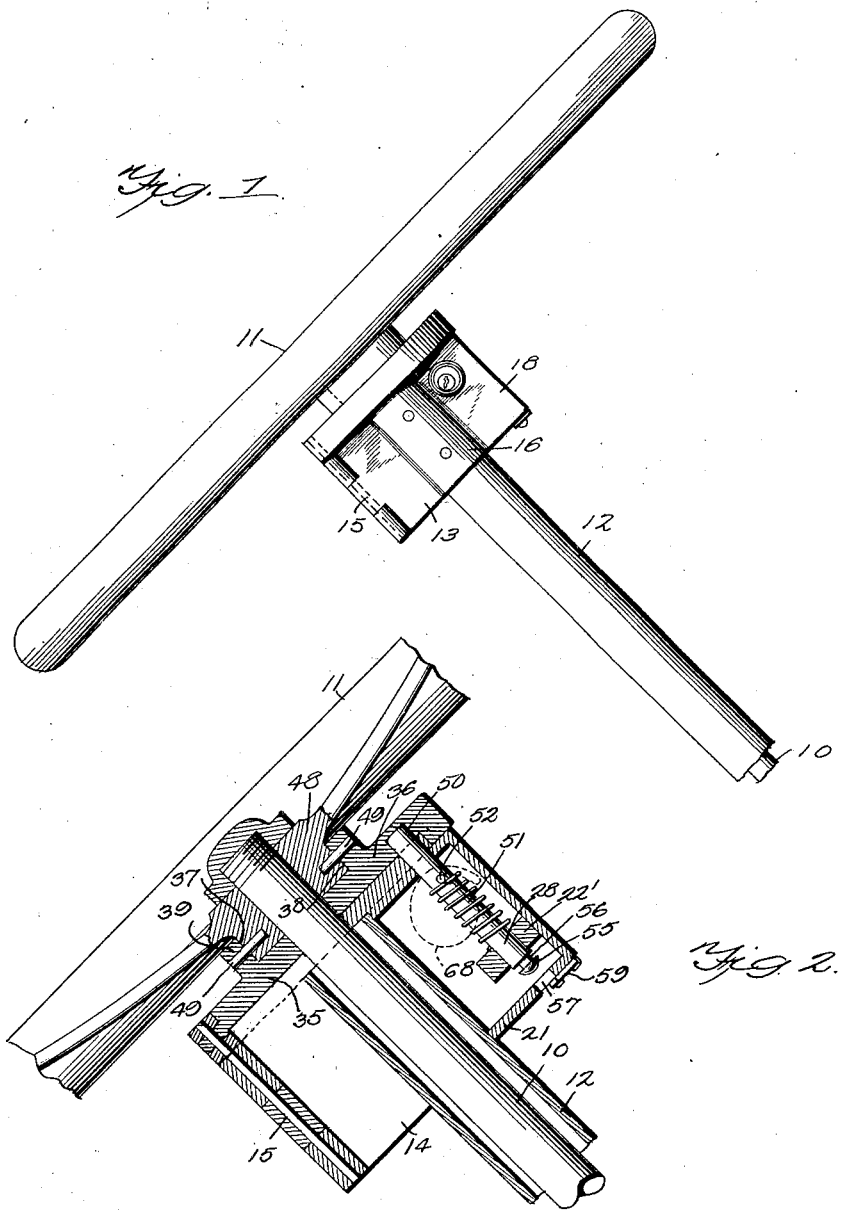

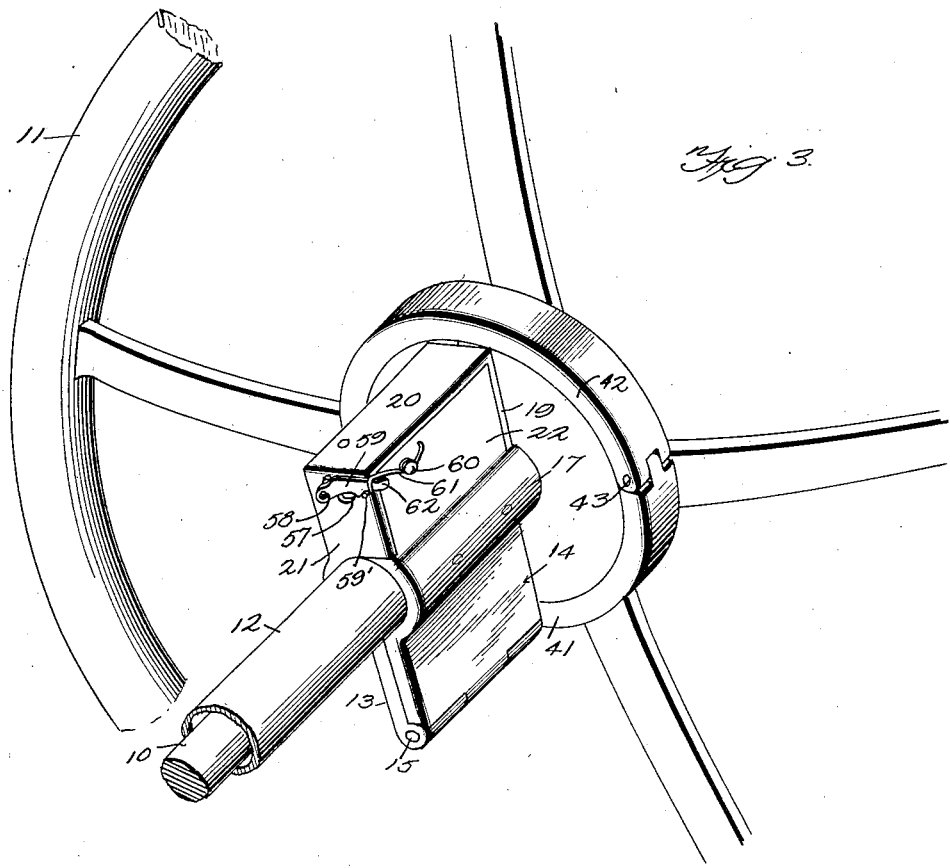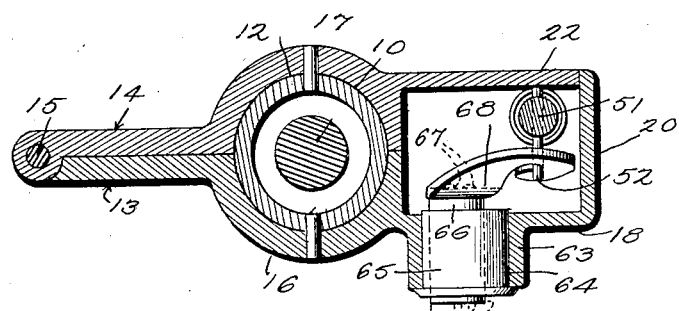

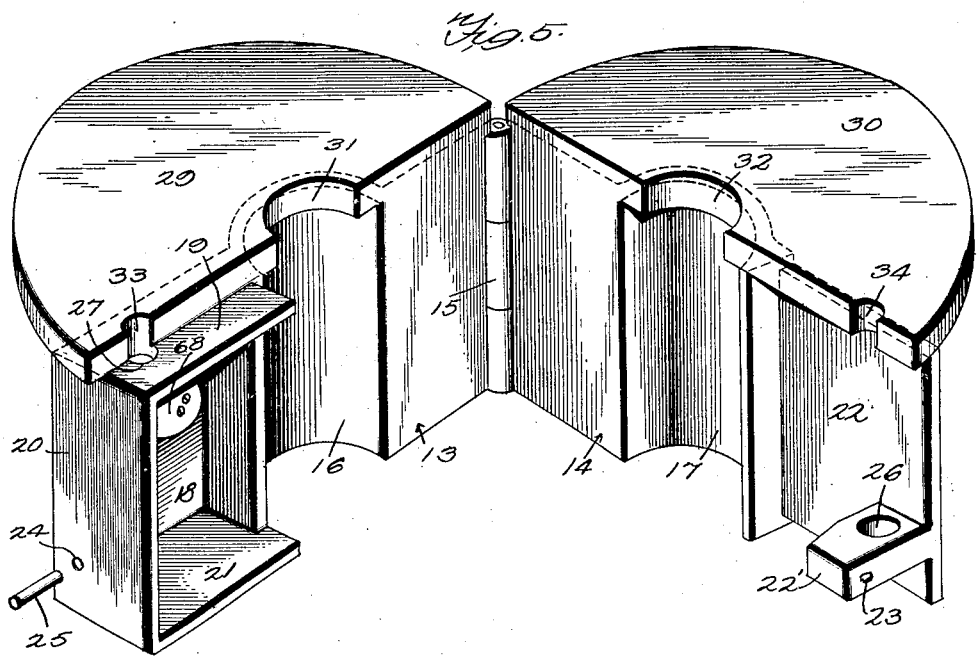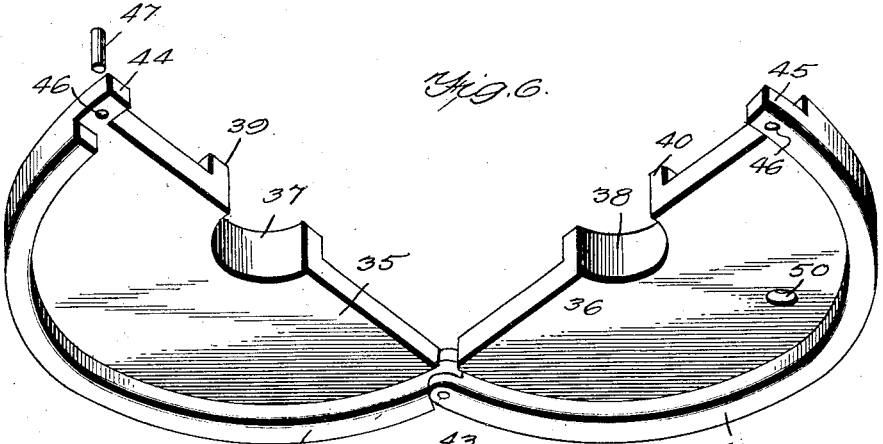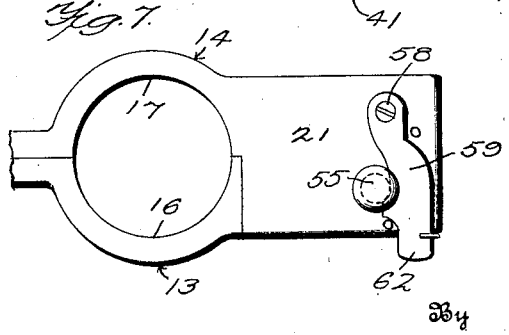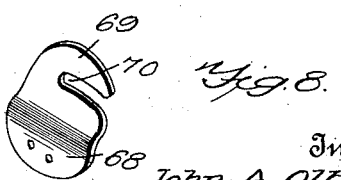

UNITED STATES PATENT OFFICE.

JOHN A. OLBON, OF PATERSON, NEW JERSEY, ASSIGNOR TO AUTO SAFETY DEVICE COMPANY, OF TOWN OF UNION, NEW JERSEY, A CORPORATION OF NEW JERSEY.

STEERING-POST LOCK.

1,360,675.  Specification of Letters Patent.  Patented Nov. 30, 1920.

Application filed October 14, 1919, Serial No. 330,639. Renewed September 30, 1920. Serial No. 413,951.

*To all whom it may concern:*

Be it known that I, JOHN A. OLBON, a citizen of the United States, residing at Paterson, in the county of Passaic and State of New Jersey, have invented certain new and useful Improvements in Steering - Post Locks, of which the following is a specification.

This invention relates to improvements in steering post locks.

An important object of the invention is to provide means whereby the steering wheel of an automobile may be locked in order to prevent theft of the machine during the owner's absence.

A further object is to provide such a lock of neat appearance and which will not detract from the appearance of the machine.

A further object is to provide such a lock having means to prevent the locking bolt from coming into engagement due to jar or vibration of the machine during the driving thereof.

Other objects and advantages will be apparent throughout the course of the following description.

In the drawings wherein for the purpose of illustration is shown a preferred embodiment of my invention, and wherein like numerals designate like parts throughout.

Figure 1 is a side elevation of an automobile steering wheel and post and having my lock attached thereto.

Fig. 2 is an enlarged longitudinal section therethrough.

Fig. 3 is a perspective of the lock shown in Fig. 1, taken from the under side thereof.

Fig. 4 is a transverse section through the lock.

Fig. 5 is a perspective view of the lock casing.

Fig. 6 is a perspective view of the plate which is attached to the steering post of the machine.

Fig. 7 is a bottom plan view of the lock, and

Fig. 8 is a perspective of the bolt withdrawing member of the lock.

Referring now more particularly to the drawings the numeral 10 indicates the steering post of an automobile having secured to the upper end thereoef a steering wheel 11. Surrounding the post is the usual steering post casing 12.

A pair of complementary lock sections 13 and 14 are provided hinged together as at 15. The sections 13 and 14 are provided centrally thereof, with vertical curved portions 16 and 17 which combine to form an opening adapted for the reception of the steering post casing 12. These sections when clamped about the casing grip the casing tightly.

The plate 13 has a portion 18 forming one wall of the lock casing proper. This wall has side walls 19, 20 and 21 outstanding therefrom and coacting with a wall 22 forming a portion of the section 14 to complete the lock casing. The wall of plate 22 is provided with an outstanding lug 22', having an opening 23 formed therein. This opening is adapted to coact with an opening 24 formed in the wall 20 to receive a pin 25 to hold the sections 13 and 14 in closed relation. The lug 22' is also provided with a vertical opening 26 which alines with an opening 27 formed in the plate 19. These openings slidably receive a locking bolt 28.

The sections 13 and 14 are provided upon their upper ends with semicircular flanges 29 and 30 respectively. These flanges are provided with complementary receses 31 and 32 adapted to coact to form an opening to rotatably receive the steering post 10. By inspecting Fig. 2 it will be obvious that the sections 13 and 14 may not be forced downwardly upon the steering post casing because of the fact that the flanges engage against the top of the casing 12. The halves 29 and 30 of the flanges are also provided with recesses 33 and 34 respectively which coact to form an opening alined with the openings 26 and 27 when the casing is assembled to slidably receive the locking bolt 28.

A circular plate adapted to be secured to the steering post is provided, this plate comprising complementary sections 35 and 36 having central recesses 37 and 38 respectively which coact to form an opening adapted to receive the steering post 10. Upon their upper surfaces the sections 35 and 36 are provided with upstanding flanges 39 and 40 which are adapted to receive the hub 48 of the steering wheel 11. The hub is secured to the flanges by means of pins 49 or the like. The sections 35 and 36 are provided with the depending flanges 41 and 42. These flanges extend over plates or sections 29 and 30 when the lock is assembled on the steering wheel and prevent insertion of a sharp edged tool for prying the lock open. The sections are hinged together as at 43 and are provided opposite the hinge with complementary sections 44 and 45 having openings 46 therein which are adapted to aline when the sections are in the assembled position to receive a pin 47 for securing them in such assembled position, the plate 36 is provided in its under side with a recess 50 which is adapted to receive the upper end of the bolt 28 to lock the plate and steering wheel to the lock casing. As clearly shown in Fig. 2 the flange formed by the complementary flanges 41 and 42 engages against the outside of the flange formed by the sections 29 and 30. It is to be noted that the inner portions of the plate engage under the hub of steering wheel and are consequently held against vertical displacement.

Mounted about the bolt 28 is a compression spring 51 which extends intermediate the lug 22′ and a pin 52 extending transversely through the bolt 28. This spring normally projects the bolt for engagement with the opening 50 in the plate secured to the steering wheel. The lower end of the bolt 28 is rounded as at 55 and the bolt is provided with adjacent such rounded end with an annular groove 56. The plate 21 is provided with the opening 57 through which the end of the bolt extends when in withdrawn position. Pivoted upon the plate 21 as at 58 is a latch member 59. Upon the plate 22 is provided a screw 60 about which is mounted a spring 61, one end of which engages the latch forcing it into engagement with a lug 59′ formed upon the plate 21. By inspecting Fig. 3 it will be seen that when the latch is in this position it extends partially over the opening 57. If the bolt is withdrawn the rounded head forces the latch member to one side and the spring returns the latch to engage in the groove 56. A thumb piece 62 is provided upon the latch whereby the bolt may be released.

The plate 18 is provided with an outstanding portion 63 having a bore 64 adapted to receive a lock 65. The lock 65 has the usual rotatable key operated member 66 to which is secured, as at 67, a bolt withdrawing member 68. The bolt withdrawing member 68 has a hook portion 69 forming a slot 70 which receives the pin 52 of the bolt 28. It will be seen that when the member 65 is rotated by the key the bolt is withdrawn and that the bolt as soon as completely withdrawn is locked in position by the latch 59. It is now immaterial whether the key is withdrawn or not, as the bolt cannot move upwardly for engagement in the opening 50 until the latch is released.

As many changes are possible in the shape, size and arrangement of the various parts shown without in any manner departing from the spirit of the invention, I do not limit myself to the specific structure therein shown, but may make any such changes without departing from the spirit of the invention or the scope of the subjoined claims.

What I claim is:

1. In a lock of the type described, a plate mounted about the steering post of the automobile and secured against rotation with relation thereto, means preventing upward displacement of said plate, said plate being provided upon its under side with a recess, a lock casing secured about the steering post casing and provided upon its upper end with a portion rotatably receiving the steering post and abutting the upper end of said steering post casing, a circular flange plate formed upon the upper surface of said lock casing, a depending flange formed upon said plate and rotatably engaging the periphery of said flange plate, a locking bolt slidably mounted in said lock casing, a spring normally projecting said bolt for engagement with the recess in said plate and means for withdrawing said bolt.

2. In a lock of the type described, a plate mounted about the steering post of the automobile and secured against rotation with relation thereto, means preventing upward displacement of said plate, said plate being provided upon its under side with a recess, a lock casing secured about the steering post casing and provided upon its upper end with a portion rotatably receiving the steering post and abutting the upper end of said steering post casing, a locking bolt slidably mounted in said lock casing, a spring normally projecting said bolt for engagement with the recess in said plate means for withdrawing said bolt an opening formed in the lower end of said lock casing through which the lower end of said locking bolt extends, a spring pressed locking plate normally partially covering said opening, a rounded lower end formed on said bolt adapted to displace said locking plate to allow passage of said bolt through said opening, and an annular groove formed in said bolt adapted to receive said locking plate.

3. In a lock of the type described, a plate mounted about the steering post of the automobile and secured against rotation with relation thereto, means preventing upward displacement of said plate, said plate being provided upon its under side with a recess, a lock casing secured about the steering post casing and provided upon its upper end with a portion rotatably receiving the steering post and abutting the upper end of said steering post casing, a circular flange plate formed upon the upper surface of said lock casing, a depending flange formed upon said plate and rotatably engaging the periphery of said flange plate, a locking bolt slidably mounted in said lock casing, a spring normally projecting said bolt for engagement with the recess in said plate, means for withdrawing said bolt, an opening formed in the lower end of said lock casing through which the lower end of said locking bolt extends, a spring pressed locking plate normally partially covering said opening, a rounded lower end formed on said bolt adapted to displace said locking plate to allow passage of said bolt through said opening, and an annular groove formed in said bolt adapted to receive said locking plate.

4. In a lock of the type described, a member mounted upon the steering post of the automobile and secured against rotation with relation thereto, a recess formed in said member, a lock casing secured about the steering post and held against rotation with relation thereto, a locking bolt slidably mounted in said lock casing, a spring normally projecting said bolt for engagement with the recess in said plate, means for withdrawing said bolt, an opening formed in the lower end of said lock casing through which the lower end of said locking bolt extends, a spring pressed locking plate normally partially covering said opening, a rounded lower end formed on said bolt adapted to displace said locking plate to allow passage of said opening, and an annular groove formed in said boat adapted to receive said locking plate.

In testimony whereof I affix my signature.

JOHN A. OLBON.